Patented Aug. 11, 1925.

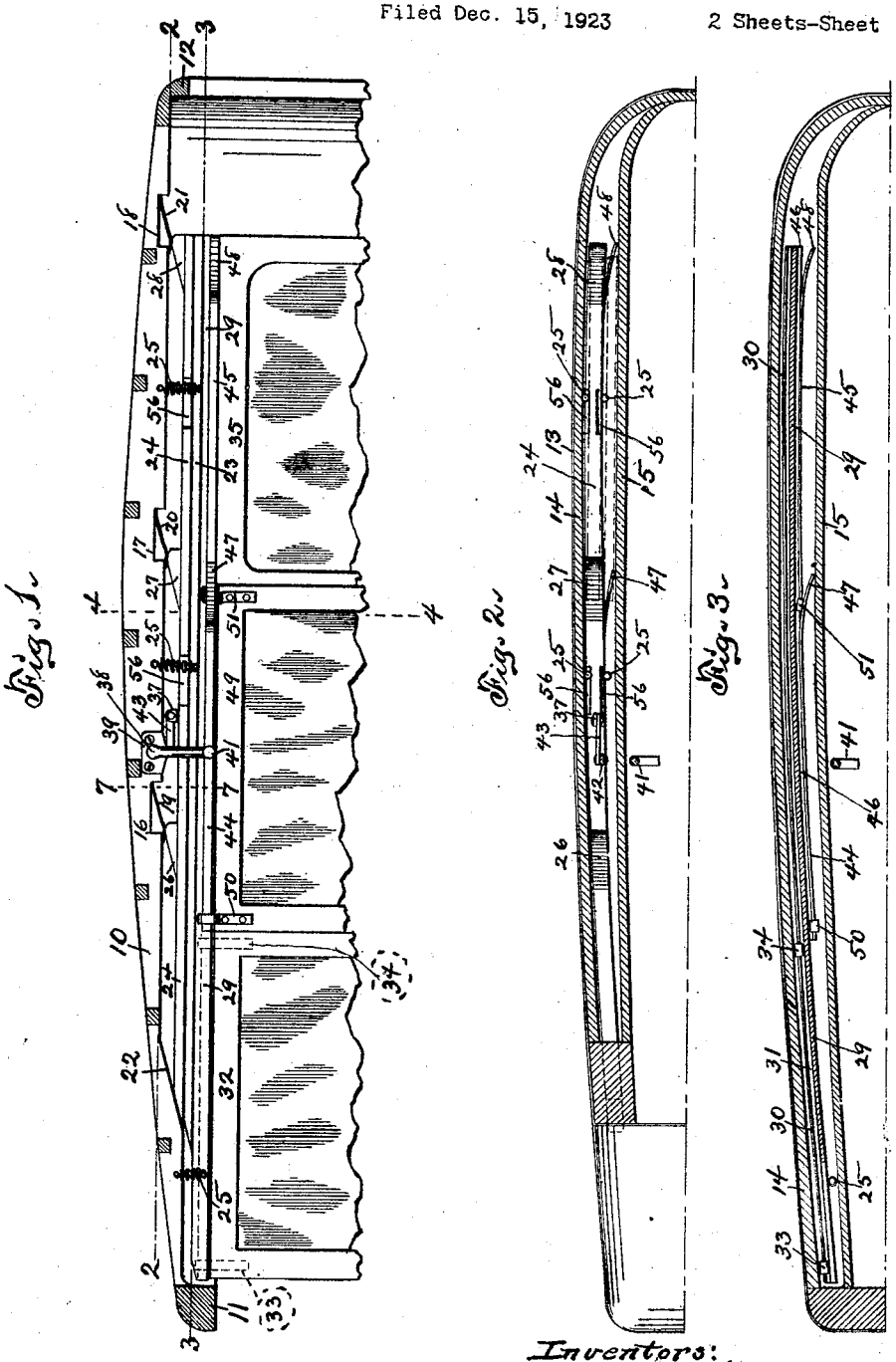

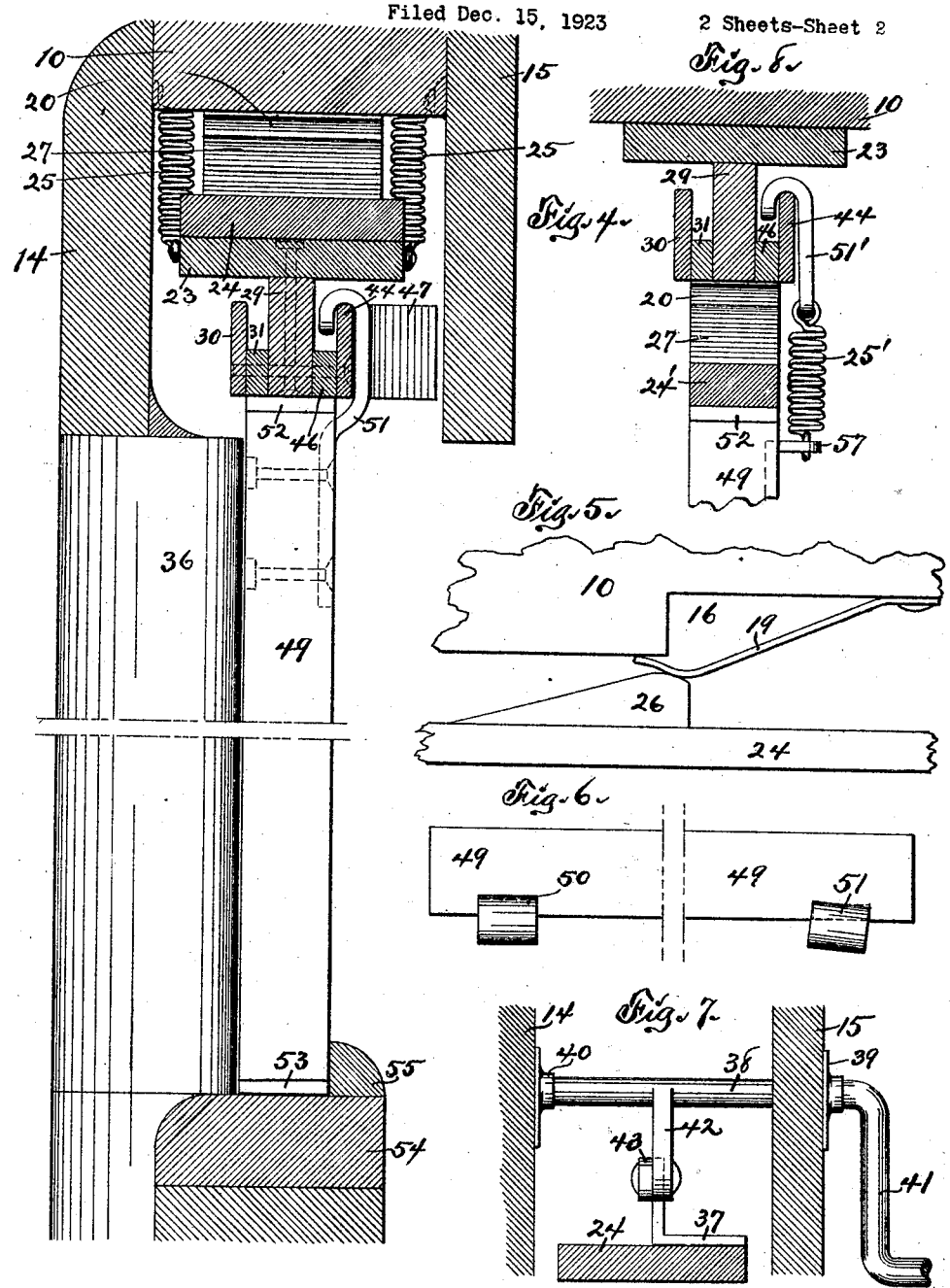

1,549,077

UNITED STATES PATENT OFFICE.

ROY C. ENDSLEY AND BERNARD M. EUBANKS, OF DENVER, COLORADO.

AUTOMOBILE TOP.

Application filed December 15, 1923. Serial No. 680,966.

*To all whom it may concern:*

Be it known that we, ROY C. ENDSLEY and BERNARD M. EUBANKS, each a citizen of the United States of America, and resident of the city and county of Denver, Colorado, have invented a new and useful Improvement in Automobile Tops, of which the following is a specification.

An object of this invention is to provide an improved construction for automobile tops.

A further object of this invention is to provide improved means for applying a brake to a sliding window in an automobile top at any point in the travel thereof.

A further object of this invention is to provide an improved track for sliding windows in an automobile top.

A further object of this invention is to provide an improved construction of a hanger or lug for a sliding window in an automobile top.

A further object of this invention is to provide an improved construction for switching a sliding window from one plane of travel to another plane substantially parallel therewith.

A further object of this invention is to provide improved means for manually operating a window brake.

A further object of this invention is to provide an improved construction for a window brake.

Our invention consists in the construction, arrangement and combination of elements hereinafter set forth, pointed out in the claims and illustrated by the accompanying drawing, in which—

Figure 1 is an elevation, partly in section substantially on the dotted base line of Figure 2, of the interior of one side of an automobile top embodying our improvements. Figure 2 is a plan, partly in section on the indicated line 2—2 of Figure 1. Figure 3 is a horizontal section on the indicated line 3—3 of Figure 1. Figure 4 is an enlarged detail cross-section on the indicated line 4—4 of Figure 1. Figure 5 is an enlarged detail elevation of parts of the brake mechanism employed in the device. Figure 6 is an enlarged detail plan of parts of the window and hanger devices employed. Figure 7 is an enlarged detail cross-section of parts of the devices employed to operate the brake, on the indicated line 7—7 of Figure 1. Figure 8 is an enlarged detail cross-section illustrating a modification of the door hanger.

The principal parts and elements hereinafter described are duplicated on opposite sides of an automobile top and when so employed in duplicate they combine with the windshield and back curtain to enclose all of the space utilized above the body of a car. On account of such identical form and construction, one set of the parts only is illustrated and described.

In the construction of the devices as shown the numeral 10 designates a top rib having an irregular angularly-stepped lower margin and curved upper and outer margins. The rib 10 is framed into the front and rear bows 11, 12 and intermediate bows not shown and supports one end of each said bows, thus constituting the substantial side member of a enclosing top adapted to be overlaid by a deck or cover 13. Housing bars 14, 15 are fixed to opposite sides of the top rib 10 and depend below the lower margin thereof and are spaced apart thereby. Notches 16, 17 and 18 are formed in the lower face of the top rib 10 and leaf springs 19, 20 and 21 are fixed at their rear ends in said notches, extend forwardly throughout the length of the notches and overlap the lower face of the rib at the forward ends of the notches, the overlapping forward end portions of the springs being formed with downward curves and the bodies of the springs being inclined. An inclined face 22 is formed on the lower surface of the top rib 10 toward the forward end thereof materially in advance of the notch 16. A track bar 23 is arranged beneath and spaced from the top rib 10 and is of less width than said rib. A locking bar 24, or brake shoe, is interposed loosely between the track bar 23 and rib 10. The track bar 23 is supported and suspended by several pairs of retractile coil springs 25, in this instance three pairs, depending from the rib 10 and said springs exert a force to lift the track bar and clamp the locking bar 24 to the rib. The forward end portion of the locking bar 24 is inclined on its upper face and slidingly contacts with the inclined face 22 on the rib, having a wedge relation thereto. Wedges 26, 27 and 28 are formed on or fixed to the upper face of the locking bar 24 below and in contact with the inclined bodies of the leaf springs 19, 20 and 21 normally. A track rib 29 is mounted longitudinally and on the median line of and depends from the track bar 23 and is fixed thereto. A track 30 is mounted parallel with the rib 29, is spaced therefrom by a strip 31 and is rigidly secured thereto. The track 30 is of less width than the rib 29, there being a space between the upper margin of said track and the lower face of the track bar 23 to accommodate hangers or lugs as hereinafter described. A front window 32 is arranged beneath the track rib 29 and is suspended by hangers or lugs 33, 34 from the track 30. The hangers 33, 34 are formed with hooks on their upper ends, which hooks curve inwardly and engage and slide upon the upper margin of the track 30, (Fig. 3 and dotted lines Fig. 1). A rear window 35 is mounted rigidly in a side frame 36 permanently associated with the body of the car, and the window 32 is adapted to be moved longitudinally of the body from the position in which it is shown the full length of the track 30 into a position adjacent and parallel to the fixed window 35 as hereinafter explained. An angle bracket 37 is fixed to the upper surface of the locking bar 24 substantially midway of the length thereof. A crank shaft 38 extends through the housing bar 15 and is journaled in bearings 39, 40 mounted on said bar and the bar 14 respectively, and a crank handle 41 on said shaft is located adjacent the inner surface of the bar 15 and extends within reach of an operator within the car. A crank arm 42 is formed on the central portion of the shaft 38 parallel with the handle 41 and a link 43 pivotally connects the extremity of the arm to the angle bracket 37. Tracks 44, 45 are mounted, in general alinement, on and substantially parallel with the rib 29, at the central and rear portions of said rib and on the opposite side thereof from the track 30. The tracks 44, 45 are spaced from the track rib 29 by a strip 46 to which said tracks are rigidly connected. The track 44 is formed with an inwardly curved rear end portion or switch 47, which overlaps the forward end portion of the track 45. The track 45 is formed with an inwardly curved rear end portion 48 of substantially the same length and degree of curvature as the portion 47, also constituting a switch, and the rear ends of said switches preferably contact with the adjacent face of the housing bar 15. A middle window 49 is arranged beneath the track rib 29 and is suspended by hangers or lugs 50, 51 from the tracks 44, 45, one hanger for each track. The hangers 50, 51 are formed with hooks on their upper ends, which hooks curve outwardly and engage and slide upon the upper margins of the tracks 44, 45, the hanger 51 having its hook twisted relative to its shank for convenience in turning the window 49 out of a straight path upon the curved switch 48.

The bodies of the tracks 44, 45 being in alinement, and the hooks on the hangers 50, 51 curving outwardly, while the hooks on the hangers 33, 34 curve inwardly, it follows that, when the window 32 is in the foremost position shown, the middle window 49 may assume the position shown in substantial alinement with the front window 32, and in a plane parallel with the rear window 35, the adjacent vertical margins of the windows 32 and 49 abutting each other. From such positions shown, the middle window 49 may be moved manually toward the rear and, when the twisted hanger 51 reaches the switch 48 and the hanger 50 reaches the switch 47, said hangers will follow the inward curves of the switches and carry and direct the window laterally toward the interior of the car and provide a space between it and the rear window 35 adapted to receive the front window 32, which may then be moved into said space by manual propulsion along the track 30. Or, either of the movable windows may be stopped at any desired point within the range of travel thereof. For instance, the middle window 49 may be moved partially or entirely into the pocket provided therefor in the rear of the side frame and the front window 32 be moved a corresponding distance so that it occupies the space formerly occupied by the middle window. This provides for ventilation or improvement of vision at the front of the side of the car and yet insures the desired measure of protection or privacy to the central and rear portions of the car. Each movable window 32 and 49 is provided with cushioning strips 52, 53 on their top and bottom margins adapted to engage the lower faces of the rib 29 and strips 31 and 46 at the top and the trim pieces 54, 55 at the bottom, the better to exclude air, rain, snow, and the like and to prevent rattling, at times. The trim piece 54 is formed with a rounded outer margin and one such piece is provided for and mounted on each door and the panel if any there be between said doors on the body of the car, to make a uniform plane over which the windows 32, 49 may travel. The trim pieces 55 preferably are quarter-round in cross-section and are superposed on the pieces 54 to form an inner guide for the bottom of the windows and cooperate with the bottom rails thereof and with the cushioning strips 53 in sealing relation. Whenever and wherever the movable windows are located in respect of longitudinal travel, they may be locked or braked rigidly and held against any sliding movement or oscillation by manual movement of the locking bar 34 forwardly, into the position shown in Figure 2, through downward movement of the handle 41 on an arc into the position shown. The downward movement of the handle rotatively moves the crank shaft 38, which moves the arm 42 through a downward arc, applies forward draft to the link 43 and causes said link to move the locking bar 34 forwardly. In forward movement the inclined face of the forward end of the bar 34 coacts with the inclined face 22 on the rib 10, the wedges 26, 27 and 28 coact with the inclined bodies of the leaf springs 19, 20 and 21 and the downwardly curved end portions of said springs, and the locking bar is thereby forced downwardly and, in turn, forces the track members and windows downwardly, thus rigidly clamping the windows between the lower face of the track members 29, 31, 46 and the trim pieces 54 opposed thereto. The rear upper edges of the wedges are rounded, so that they may engage in stable relation with the rounded faces of the leaf springs when the locking bar is placed in full locking position, and the cushioning strips 52, 53 yield under pressure to permit such adjustment. The windows are released or unlocked by a reverse movement of the handle 41, which results in a reverse movement of the locking bar 24 to the end that the lifting force of the springs 25 may be exerted to raise the wedges 26, 27, 28 into the notches 16, 17, 18 and raise the track members from the tops of the windows and the windows free from the trim pieces 54, after which either or both movable windows may be manually adjusted as described. Notches 56 may be provided in the side margins of the locking bar 24 to accommodate the springs 25. By reference to Figure 5 it will be noticed that, when the locking bar 24 is moved forwardly to the limit of its range, the rounded edge of the wedge passes beyond the dead center of the leaf spring, thus providing efficient means for preventing accidental reverse, or unlocking, movement of said bar.

In the modification shown in Figure 8 some of the parts are transposed and others altered as follows: The track bar 23 is fixed directly to and beneath the top rib 10 and carries the tracks and strips as before. The windows are suspended at a distance below the tracks by hangers or lugs 51' sliding on the tracks, retractile coil springs 25' depending from and suspended by said hangers, and angle plates 57 fixed to the frames of the windows and suspended from the lower ends of said springs. Downwardly inclined and curved leaf springs 20' are fixed at intervals to the lower surfaces of the track rib 29 and strips 31 and 46 and wedges 27' on the upper surface of a locking bar 24' are adapted to engage said leaf springs at times, said springs and wedges being substantially identical in form and operation as above described and the locking bar being mounted for rectilinear reciprocation immediately above the windows. Suitable means may be provided for reciprocating the bar 24' that will not interfere with the travel of either movable window, in order that said bar may act through the wedges and leaf springs to clamp the windows to the trim pieces on the car body in any positions in which they may be placed manually.

Other modifications of structure and arrangement may be provided without departing from our invention.

We claim as our invention—

1. In an automobile top, a frame member, track members suspended in spaced relation therefrom, leaf springs on the lower face of said frame member, a locking bar mounted for reciprocation between said track members and springs, wedges on said locking bar adapted to slidingly engage said springs, and windows suspended from and slidable relative to said track members.

2. In an automobile top, a frame member formed with notches in its lower face, leaf springs mounted in said notches and inclined and curved downwardly therefrom, track members yieldingly suspended from said frame member, a locking bar mounted for reciprocation between said track members and the frame member, wedges on the upper face of said locking bar adapted to enter the notches and engage said springs, said wedges being adapted to be moved longitudinally by engagement with said springs when the bar is reciprocated, and windows slidingly mounted on and suspended by said track members.

3. In an automobile top, a frame member, a track assembly yieldingly suspended thereon, windows suspended by and slidable on said track assembly, the track assembly being vertically adjustable independently of the windows, a locking bar mounted for reciprocation between said frame member and track assembly and wedge elements between the locking bar and frame member, whereby said track assembly may be frictionally engaged with said windows when the locking bar is moved in one direction longitudinally.

4. In an automobile top, a frame member, a track assembly yieldingly suspended thereon, windows suspended by and slidable on said track assembly, the track assembly being vertically adjustable independently of the windows, a locking bar mounted for reciprocation between said frame member and track assembly, wedge elements, formed with rounded base edges, located between the locking bar and frame member and leaf springs supported by and inclined relative to said frame member and adapted to be engaged by said wedge elements, whereby said track assembly may be frictionally engaged with said windows when the locking bar is moved in one direction longitudinally.

5. In an automobile top, a support, a leaf spring inclined relative to said support and formed with a convex end portion, a locking bar movable longitudinally, a wedge mounted on said bar and adapted to engage the inclined face of the spring, said wedge being formed with a rounded edge at its head adapted to be carried past the dead center of the convex face of the spring, and a track assembly suspended yieldingly on said support and carrying said locking bar.

6. In an automobile top, a frame member, a track assembly yieldingly suspended thereon and including one uninterrupted track, a window slidingly mounted on the track, another track formed in two parts substantially in alinement and substantially parallel with and spaced from the first track, each part of the second track being formed with a laterally-curved rear end portion, a window slidingly mounted on the second track, separate hangers being employed to suspend the latter window from the two parts of the latter track, whereby the latter window may be shunted out of the path of the first window at times, said track assembly being movable vertically independently of said windows, a locking bar mounted for reciprocation between said frame member and track assembly and wedge elements between the locking bar and frame member, whereby said track assembly may be frictionally engaged with said windows when the locking bar is moved in one direction longitudinally.

7. In an automobile top, a frame member, a longitudinal track assembly yieldingly suspended thereon and comprising a track bar, a track rib depending therefrom, tracks supported by said rib and in spaced relation therewith and with the bar, one of said tracks being continuous from end to end, the other of said tracks being formed of two substantially alining parts and formed with laterally curved portion at one end of each part, windows suspended by and slidable on said track assembly, the track assembly being vertically adjustable independently of the windows, a locking bar mounted for rectilinear reciprocation between said frame member and track assembly and wedge elements between the locking bar and frame member, whereby said track assembly may be frictionally engaged with said windows when the locking bar is moved in one direction longitudinally.

8. In an automobile top, a longitudinal track assembly comprising a track bar, retractile coil springs suspending said bar, a track rib depending from said bar, tracks on opposite sides of and supported by said rib in spaced relation therewith and also spaced from the track bar, and a locking bar superposed on and adapted to engage and depress said track bar at times.

9. In an automobile top, a longitudinal housing, a track assembly loosely mounted in said housing, yielding pressure devices suspending said track assembly, a locking bar superposed on said track assembly within said housing, coacting wedge devices on said bar and the top member of said housing, a crank shaft mounted for manual oscillation in said housing, an arm on said shaft within said housing and flexible connections between said arm and locking bar, whereby said bar may be longitudinally reciprocated, the coacting wedge devices operating at times to depress the track assembly through said locking bar.

Signed at Denver, in the county of Denver and State of Colorado, this 7th day of November, 1923.

ROY C. ENDSLEY.
B. M. EUBANKS.